United States Patent
Hasegawa et al.

(10) Patent No.: US 7,167,509 B2
(45) Date of Patent: Jan. 23, 2007

(54) DIGITAL SUBSCRIBER LINE COMMUNICATING SYSTEM AND A TRANSCEIVER IN THE SYSTEM

(75) Inventors: Kazutomo Hasegawa, Kawasaki (JP); Seiji Miyoshi, Kawasaki (JP); Yutaka Awata, Yokohama (JP); Takashi Sasaki, Kawasaki (JP); Nobukazu Koizumi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/070,751

(22) Filed: Mar. 2, 2005

(65) Prior Publication Data
US 2005/0157779 A1     Jul. 21, 2005

Related U.S. Application Data

(62) Division of application No. 09/336,636, filed on Jun. 18, 1999.

(30) Foreign Application Priority Data

Jun. 19, 1998   (JP)   ................................ 10-172464

(51) Int. Cl.
*H04B 1/38*     (2006.01)
(52) U.S. Cl. ..................................... 375/219
(58) Field of Classification Search ................ 375/219, 375/220, 222, 295, 316, 354, 259, 377, 346, 375/348; 370/201; 379/414, 416; 455/63.1, 455/39, 73, 296, 130
See application file for complete search history.

(56) References Cited

U.S. PATENT DOCUMENTS 3,770,894 A    11/1973  May Jr.
4,009,347 A    2/1977   Flemming et al.

(Continued)

FOREIGN PATENT DOCUMENTS

EP    0 840 475    5/1998

(Continued)

OTHER PUBLICATIONS

European Search Report dated Mar. 9, 2005.

(Continued)

*Primary Examiner*—Pankaj Kumar
(74) *Attorney, Agent, or Firm*—Katten Muchin Rosenman LLP

(57) ABSTRACT

A digital subscriber line communicating system for communicating between a transmitting side and a receiving side tough a communication line, the system including a hyperframe counter for periodically counting a predetermined number of continuous transmitting data symbols constituting a hyperframe synchronized with a timing signal, and a decoder for discriminating, based on the count value of the hyperframe counter, whether a transmitting data symbol belongs to a $FEXT_R$, or a $NEXT_R$.

A sequencer is provided for initializing the status during an initialization period before starting usual communication. The initialization period includes an activation and acknowledgement sequence, a transceiver training sequence, a channel analysis sequence, and an exchange sequence. According to a single bitmap mode, the initialization is carried out by transmitting modulated symbols through only inside of the sliding window. According to a dual bitmap mode, the initialization except for an S/N measuring sequence in the channel analysis sequence is carried out by transmitting modulated symbols through only inside of the sliding window, and the S/N measuring sequence is carried out by transmitting modulated symbols through both inside and outside of the sliding window.

2 Claims, 15 Drawing Sheets

U.S. PATENT DOCUMENTS

| | | | |
|---|---|---|---|
| 4,208,724 A | | 6/1980 | Rattlingourd |
| 4,574,377 A | | 3/1986 | Miyazaki et al. |
| 5,185,736 A | | 2/1993 | Tyrrell et al. |
| 5,359,366 A | | 10/1994 | Ubukata et al. |
| 5,526,347 A | | 6/1996 | Chen et al. |
| 5,680,394 A | | 10/1997 | Bingham et al. |
| 5,991,311 A | * | 11/1999 | Long et al. ............... 370/524 |
| 6,009,122 A | * | 12/1999 | Chow ...................... 375/260 |
| 6,021,500 A | | 2/2000 | Wang et al. |
| 6,212,225 B1 | * | 4/2001 | Agazzi .................... 375/220 |
| 6,580,752 B1 | | 6/2003 | Amrany et al. |
| 6,724,849 B1 | | 4/2004 | Long et al. |
| 6,804,267 B1 | | 10/2004 | Long et al. |
| 2003/0190000 A1 | | 10/2003 | Matsumoto |
| 2004/0057564 A1 | | 3/2004 | Rappaport et al. |

FOREIGN PATENT DOCUMENTS

| | | | |
|---|---|---|---|
| EP | 1 018 831 | | 7/2000 |
| JP | 11-355183 | | 12/1999 |
| JP | 11341153 A | * | 12/1999 |
| JP | 2000-32096 | | 1/2000 |

OTHER PUBLICATIONS

Hiroshi Okado et al. A Study on ADSL System for TCM-ISDN crosstalk. NEC Corporation p. 403.

Sorbara, et al. "Constellation Time Division Multiplexing for the 6 MB/S ADSL" Serving Humanity Through Communications SUPERCOMM/ICC. May 1994, IEEE, US vol. 2: pp. 821-825: XP002019301.

Okamura, et al. "ADSL System for Time Periodic Noise Environments" NEC Research and Development. vol. 40, No. 1 Jan. 1999; pp. 64-69, XP000869790; ISSN: 0547-051X.

International Communications Union: "G.992.2 Asymmetric Digital Subscriber Line (ADSL) Transceivers" ITU.T Recommendation Series G.: Transmission Systems and Media , Digital System and Networks, Jun. 22, 1999; XP002200769; pp. 111-145.

* cited by examiner

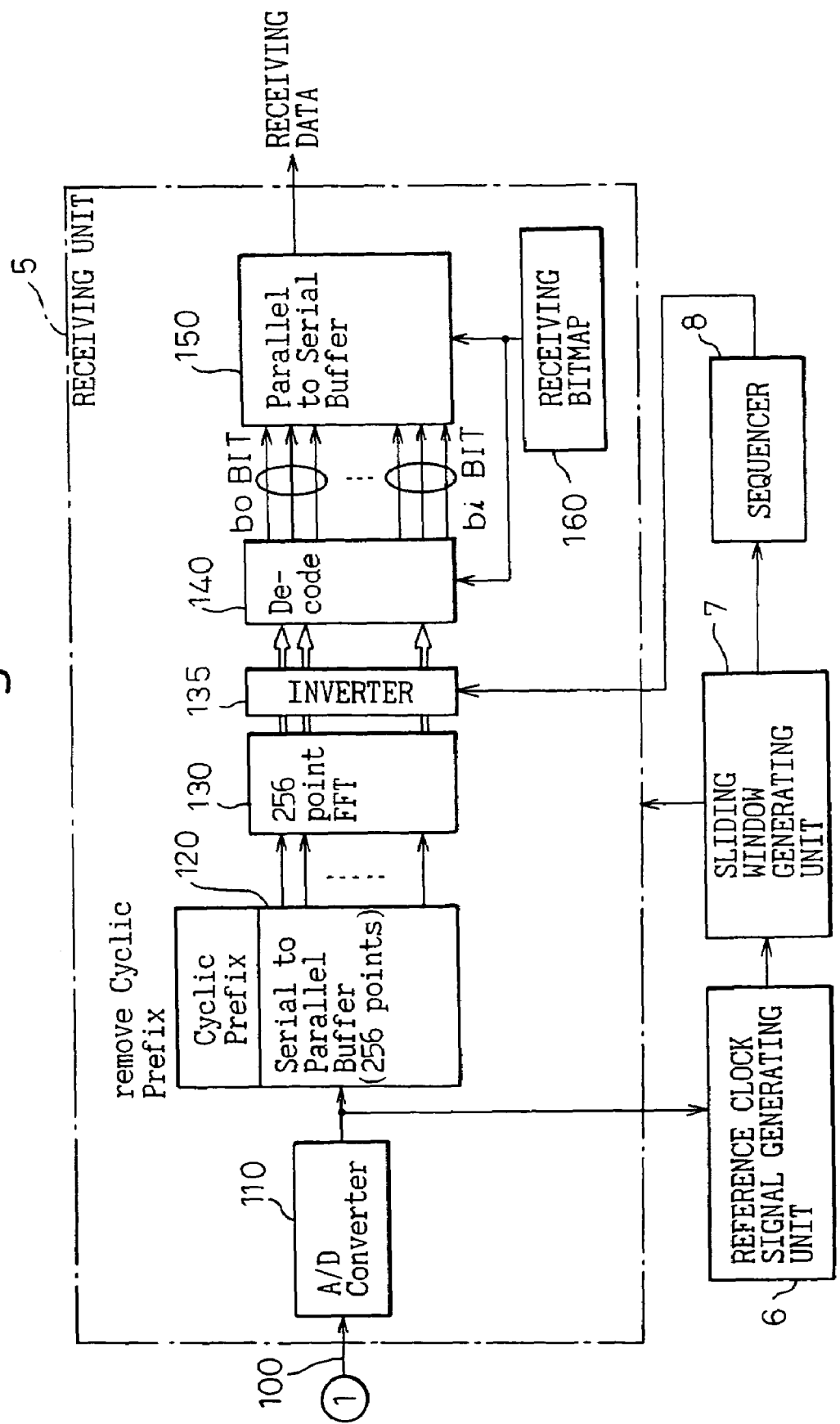

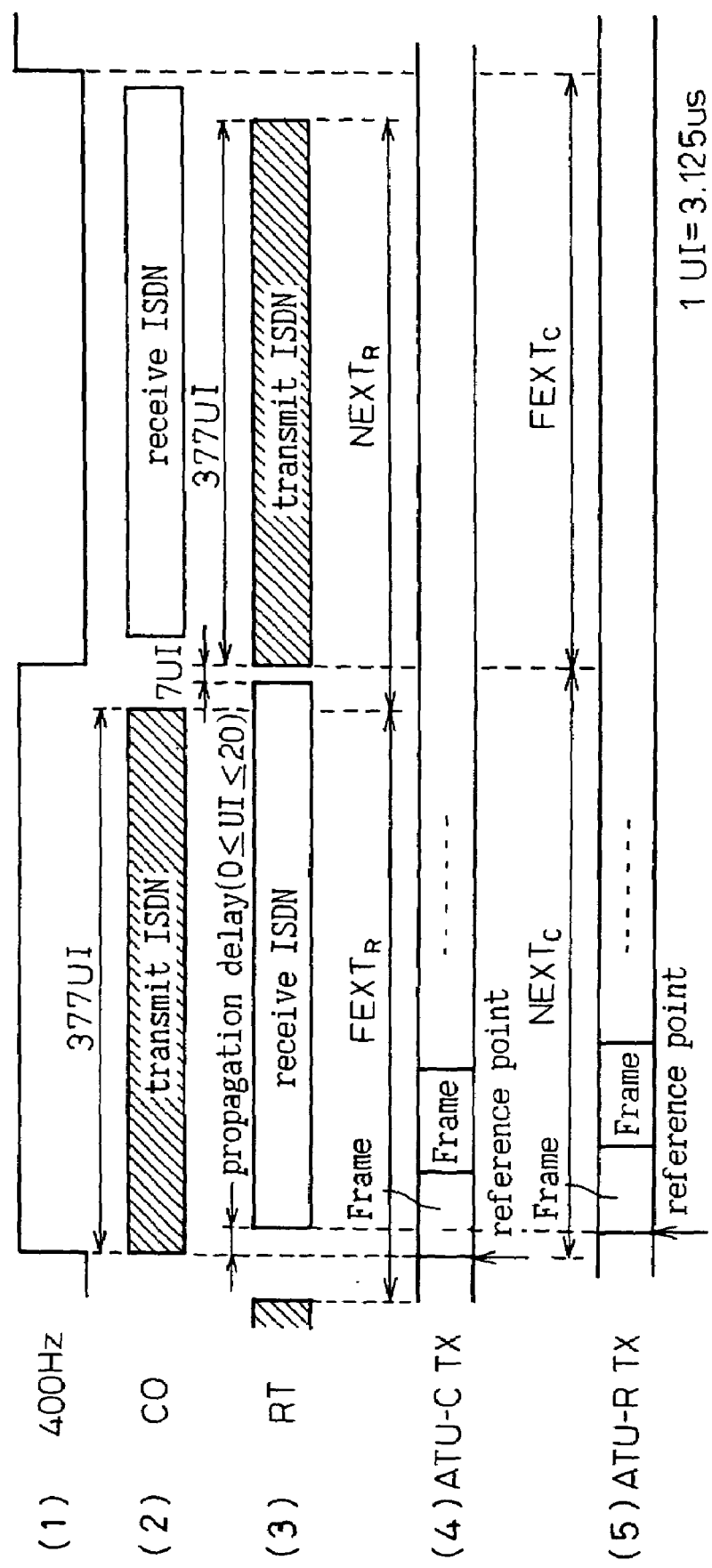

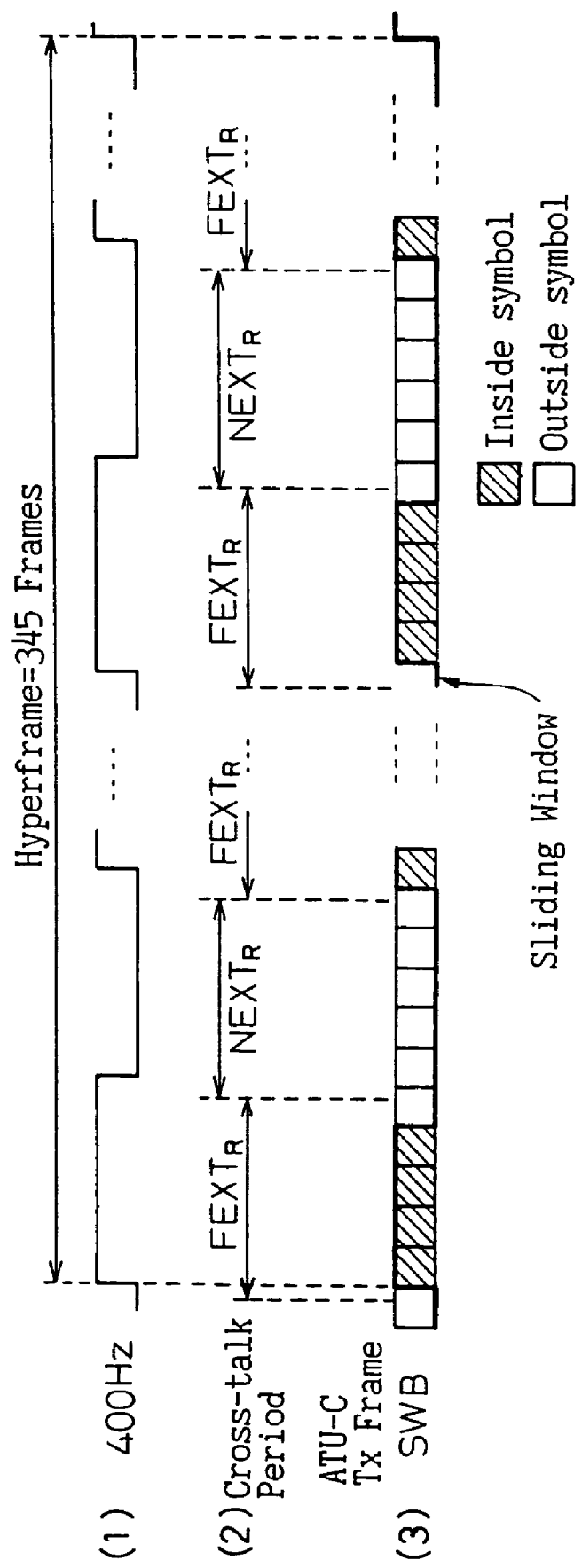

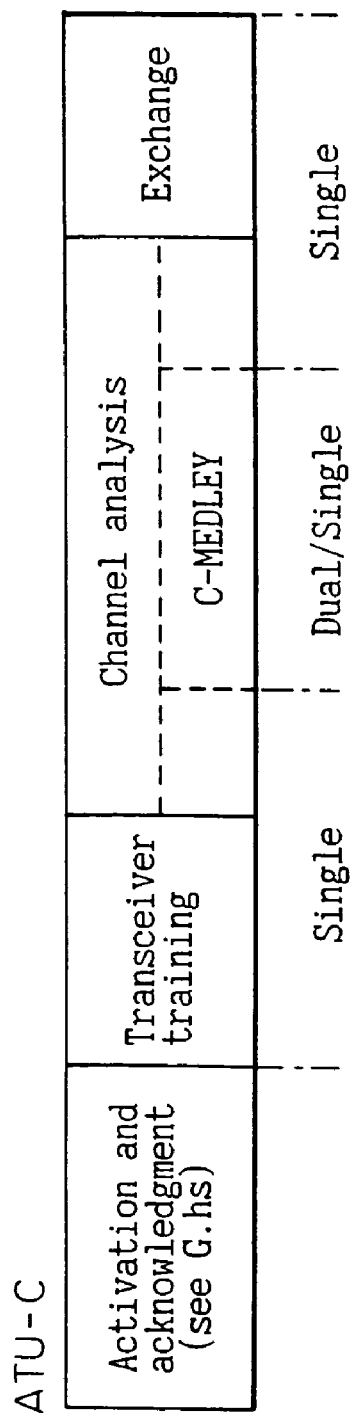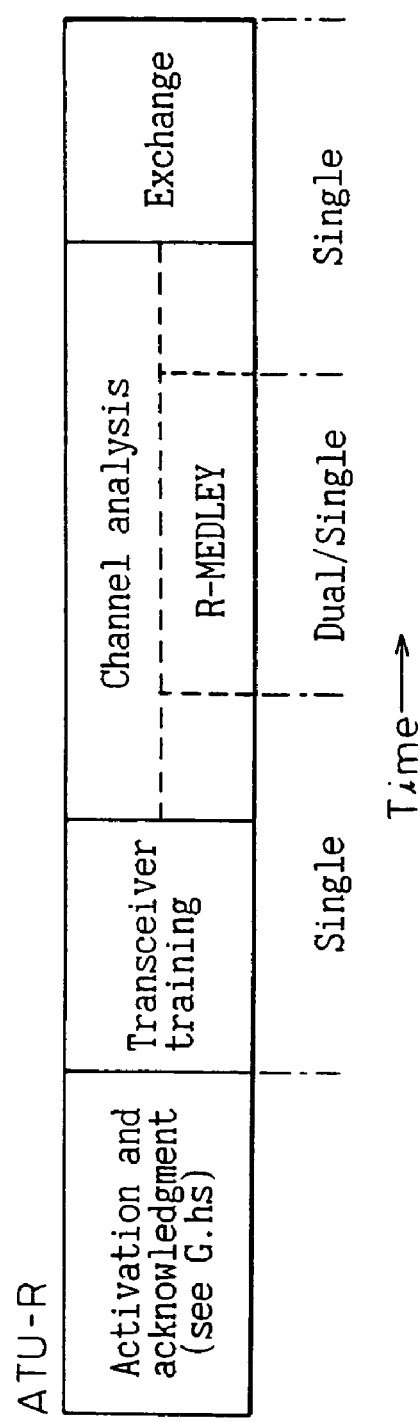

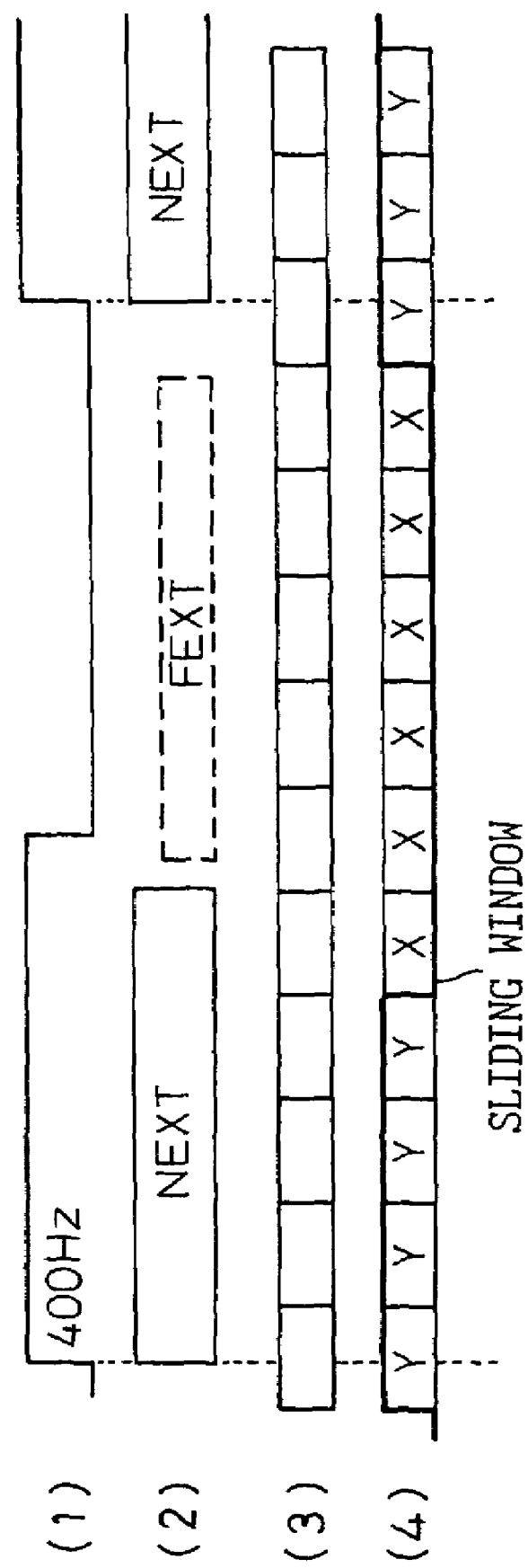

| CARRIER NO. i | NUMBER OF TRANSMITTED BITS bi |
|---|---|
| 0 | 0 |
| ⋮ | ⋮ |
| 48 | 5 |
| 49 | 7 |
| ⋮ | ⋮ |

DIGITAL SUBSCRIBER LINE COMMUNICATING SYSTEM AND A TRANSCEIVER IN THE SYSTEM

CROSS-REFERENCE TO RELATED APPLICATION

This application is a divisional of U.S. Application 09/336,636 which was filed on Jun. 18, 1999 and claims priority from Japanese Patent Application 10-172464 filed on Jun. 19, 1998, the contents of which are herein wholly incorporated by reference.

BACKGROUND OF THE INVENTION

1. Field of the Invention

The present invention relates to a digital subscriber line communicating system and a transceiver in the system which utilize an existing telephone line as a high speed data communication line. More particularly, it relates to an improvement of a modulation/demodulation system in a transmission apparatus used in the above-mentioned communication system.

In recent years, multimedia services such as internet and so forth have expanded through society and into homes. Accompanied by such development, it has been strongly required to promptly provide an economical and reliable digital subscriber line communicating system for utilizing such services.

2. Description of the Related Art (1) An Explanation of an ADSL

As a technique to provide a subscriber line communicating system which utilizes the existing telephone line as a high speed data communication line, an xDSL (Digital Subscriber Line) is known. xDSL is a communicating system which utilizes a telephone line and a modulation/demodulation technique. xDSLs are generally classified into a symmetric type and an asymmetric type. In the symmetric type, upstream transmission speed from a subscriber home (hereinafter referred to as a remote terminal side or an RT side) to an accommodating central office (hereinafter referred to as a central office side or a CO side) is symmetric with the transmission speed from the central office side to the remote terminal side. In the asymmetric type, the transmission speed from the remote terminal side to the central office side is asymmetric with the transmission speed from the central office side to the remote terminal side.

In the asymmetric xDSLs, there is an Asymmetric DSL (ADSL) modem which is provided with the G.DMT standard having a downstream transmission speed of about 6 Mbit/sec. and the G.lite standard having a downstream transmission speed of about 1.5 bits/sec. Both of the G.DMT and G.lite employ Descrete Multitone (DMT) modulation.

(2) An Explanation of the DMT Modulation

DMT modulation will be explained using G.lite as an example. This explanation and the associated drawing will describe only the downstream modulation/demodulation from the central office to the remote terminal. However, DMT modulation is also possible in the upstream modulation/demodulation.

Firstly, transmitting data is input into an ADSL transceiver unit (ATU) in the central office and a one-symbol time (¼ kHz) of the data is stored in a serial to parallel buffer. The stored data are divided into a plurality of groups. A predetermined number of transmission bits per carrier signal is previously allocated to each group in accordance with a transmitting bitmap which will be described later in detail. Each group is output to an encoder. In the encoder, each group of the input bit series is converted into a signal point expressed by a complex number for an orthogonal amplitude modulation and is output to IFFT. The IFFT performs the conversion from each of the signal points to transmitting signal sequences by an inverse fast Fourier transform. The signals from the IFFT are output to a parallel to serial buffer. Here the sixteen points of the outputs of the IFFT are added as a Cyclic Prefix to the head of each DMT symbol. The output of the parallel to serial buffer is supplied to a D/A converter in which the digital signal with a sampling frequency of 1.104 MHz is converted into an analog signal. The analog signal is transmitted through a metalic line to a remote terminal.

At the remote terminal side, the analog signal is converted into a digital signal with the sampling frequency of 1.104 MHz by an A/D converter. Each DMT symbol of the digital signal is stored in a serial to parallel buffer. In the buffer, the Cyclic Prefix is removed from the digital signal, and the remaining signal is output to an FFT. In the FFT, a fast Fourier transform is effected to generate or demodulate the signal points. The demodulated signal points are decoded by a decoder in accordance with a receiving bitmap having the same values as those in the transmitting bitmap. The decoded data are stored in a parallel to serial buffer as receiving data of bit-sequences.

(3) A Detailed Explanation of the Bitmap

The bitmap described in the explanation of the DMT will be explained in detail with reference to FIGS. 13A and 13B.

The apparatus at the central office side and the apparatus at the remote terminal side both measure the ratio of the receiving signal to noise (hereinafter referred to as S/N) during a training period prior to communication to determine the number of bits to be transmitted by each modulating carrier. As shown in FIGS. 13A and 13B, for a carrier signal with a larger S/N, a larger number of bits to be transmitted are allocated; and for a carrier signal with a smaller S/N, a smaller number of bits to be transmitted are allocated.

By the above allocation, the receiving side measures the S/N to prepare the bitmap which indicates the numbers of bits to be transmitted corresponding to the carrier numbers.

The receiving side informs this bitmap to the transmitting side during a training period so that both the transmitting side and the receiving side can perform the modulation/demodulation with the use of the same bitmap during normal data communication.

(4) Countermeasure Against Cross-Talk from the Time Compression Modulation ISDN Transmission (Hereinafter Referred to as TCM ISDN Transmission)

When there is a cross-talk due to the TCM ISDN Transmission, in the prior art, two different bitmaps are used in the ADSL modem in the transmitting side or in the receiving side so as to improve the transmission characteristic. This method of using the two bitmaps will be explained with reference to FIG. 14.

In the TCM ISDN transmission, the central office side transmits downstream data during a prior half of one cycle of a reference clock signal of 400 Hz shown in (1) of FIG. 14, in synchronization with the reference clock signal of 400 Hz; and the remote terminal side receives the downstream data and then transmits upstream data. Therefore, the ADSL modem in the central office is influenced by a Near End Cross-Talk (hereinafter referred to as NEXT) from the downstream ISDN during the prior half of the one cycle of 400 Hz, and is influenced by a Far End Cross-Talk (hereinafter referred to as FEXT) from the upstream ISDN during the latter half of one cycle of 400 Hz.

Contrary to the central office, the ADSL modem in the remote terminal is influenced by a FEXT during a prior half of one cycle of the reference clock signal of 400 Hz, and is influenced by a NEXT during a latter half of the cycle.

If the metalic cable between the central office and the remote terminal is long, the S/N of the receiving signal to the NEXT is made smaller, and in some cases, the NEXT may be greater than the receiving signal.

In these cases, since the influence of the FEXT is not so large, in the prior art, two bitmaps are provided. One is a bitmap (DMT symbol X) for receiving signals during the NEXT period at the remote terminal. The other is a bitmap (DMT symbol Y) for receiving signals during the FEXT period at the remote terminal. During the NEXT period, in the prior art, the number of bits to be transmitted is made small so as to improve the resistance of the signals against the S/N. During the FEXT period, in the prior art, the number of bits to be transmitted is made large so as to increase the transmission capacity.

On the other hand, the time interval of one DMT symbol is usually 246 µs with a Cyclic Prefix of 16 points. Contrary to this, in the prior art, in order to synchronize the DMT symbols with the TCM Cross-talk period of 400 Hz, the time interval of one DMT symbol is made to be 250 µs with a Cyclic Prefix of 20 points so that one period of the TCM Cross-talk is made to coincide with the time period of ten DMT symbols, whereby the synchronization with the TCM Cross-talk is established.

(5) FEXT and NEXT

FIG. 2 is a timing chart showing the cross-talk that the ADSL receives from the TCM-ISDN.

The TCM-ISDN transmission is carried out at a frequency of 400 Hz with the period of 2.5 ms as shown in (1) of FIG. 2. During the first half cycle of each period of the TCM-ISDN, the CO side transmits symbols as shown in (2) of FIG. 2 and during the latter half cycle of the period, the RT side transmits symbols as shown in (3) of FIG. 2. In the first half cycle of the period of TCM-ISDN, therefore, the center ADSL unit (ATU-C) is affected by the near end cross-talk ($NEXT_C$) from the TCM-ISDN, and in the latter half cycle, the ATU-C is affected by the far end cross-talk ($FEXT_C$) from the TCM-ISDN as shown in (5) of FIG. 2. On the other hand, the subscriber ADSL unit (ATU-R) is affected by the $FEXT_R$ from the TCM-ISDN during the first half cycle of the one TCM-ISDN period, and by the $NEXT_R$ from the TCM-ISDN during the latter half cycle thereof. In this specification, the time areas affected by NEXT and FEXT in this way will be called the NEXT duration and the FEXT duration, respectively as shown in (4) and (5) of FIG. 2.

The center ADSL unit (ATU-C) in the CO side can estimate or define the $FEXT_R$ duration and the $NEXT_R$ duration at the subscriber ADSL unit (ATU-R) in the RT side. Also, the ADSL unit (ATU-R) in the RT can estimate or define the $FEXT_C$ duration and the $NEXT_C$ duration at the center ADSL unit (ATU-C) in the CO. That is, each period is estimated or defined as follows.

$FEXT_R$: FEXT duration at ATU-R estimated by ATU-C
$NEXT_R$: NEXT duration at ATU-R estimated by ATU-C
$FEXT_C$: FEXT duration at ATU-C estimated by ATU-R
$NEXT_C$: NEXT duration at ATU-C estimated by ATU-R The transmission delay is also taken into consideration in these definitions.

(6) Sliding Window

For the purpose of providing a digital subscriber line transmission system capable of transmitting the ADSL signal in satisfactory manner in the cross-talk environment from the TCM-ISDN described above, the present applicant has earlier proposed to introduce a "sliding window" in Japanese Patent Application No. 10-144913 (corresponding to U.S. patent Application Ser. No. 09/318,445 filed on May 25, 1999) which is incorporated herein by reference.

According to patent application Ser. No. 10-144913, in the downstream transmission of the ADSL signal from the center ADSL unit (ATU-C) to the subscriber ADSL unit (ATU-R), the state of the ADSL signal transmitted by the center ADSL unit (ATU-C) in the cross-talk environment from the TCM-ISDN is defined as follows.

That is, in the case where the transmission symbol is completely contained in the $FEXT_R$ duration, as shown in FIG. 3, the center ADSL unit (ATU-C) transmits the symbol as an inside symbol by means of the sliding window. Also, in the case where the transmission symbol is included in the $NEXT_R$ duration even partially, the center ADSL unit (ATU-C) transmits the symbol as an outside symbol.

According to the dual bitmap mode, the center ADSL unit (ATU-C) transmits the inside symbol using a bitmap A for the $FEXT_R$ duration and the outside symbol using a bitmap B for the $NEXT_R$ duration.

Similar to in the downstream transmission, according to the dual bitmap mode the subscriber ADSL unit (ATU-R) transmits the inside symbol using the bitmap A for the $FEXT_C$ duration and transmits the outside symbol using the bitmap B for the $NEXT_C$ duration in the upstream transmission.

Here, there is a case where the center ADSL unit (ATU-C) does not use the bitmap B. This case is a single bitmap mode. In such a case, the center ADSL unit (ATU-C) transmits only the pilot tone outside of the sliding window. In similar fashion, there is case where the subscriber ADSL unit (ATU-R) does not use the bitmap B. This case is also the single bitmap mode. In the single bitmap mode, the subscriber ADSL unit (ATU-R) transmits nothing outside of the sliding window.

As described above, an effective transmission technique under the noise environment from the TCM-ISDN has been proposed, for example, in Japanese Patent Application No. 10-144913 by the present applicant. Nevertheless, a specific training method for the ADSL transceiver in employing such a transmission technique or means for carrying out the training method have yet to be studied.

SUMMARY OF THE INVENTION

The present invention has been developed based on new knowledge and study of the points described above, and the object thereof is to provide a digital subscriber line transmission system and a communication apparatus used for the transmission system accompanied by a specific training method for the ADSL transceiver in employing an effective transmission technique for the ADSL signal under the noise environment from the TCM-ISDN or including means for carrying out such a training method.

According to the present invention, there is provided a digital subscriber line communicating system for communicating through a communication line, including: means for generating a sliding window based on a timing signal representing a periodical noise duration; and means for discriminating, based on a status of the sliding window, which kind of durations of the periodical noise duration a transmitting data symbol belongs to.

The system may further includes means for performing an initial training of a receiver equalizer according to the status of the sliding window.

Specifically, according to a first aspect of the invention, there is provided a digital subscriber line communicating system for communicating between a transmitting side and a receiving side through a communication line, comprising a sliding window generating unit for generating a sliding window based on a timing signal representing a periodical noise duration, and a sliding window transmitting unit for transmitting modulated symbol according to the sliding window through the communication line to the receiving side.

The sliding window generating unit comprises a hyperframe counter for periodically counting a predetermined number of continuous transmitting modulated symbols constituting a hyperframe synchronized with the timing signal; and a decoder for discriminating, based on the count value output from the hyperframe counter, whether a transmitting data symbol belongs to a far end cross-talk duration at the receiving side or a near end cross-talk duration at the receiving side.

According to a second aspect of the present invention, the hyperframe counter is reset each time when the hyperframe counter counts the predetermined number of continuous transmitting data symbols.

According to a third aspect of the present invention, the transmitting side is a central office and the receiving side is a remote terminal.

In this case, the central office comprises: a timing signal generating unit for generating the timing signal synchronized with a periodical noise including the periodical noise duration which interferes with the central office and the remote terminal; a receiver equalizer for example time domain equalizer and a frequency domain equalizer; and a sequencer for effecting a transition of the status of initialization of the central office during an initialization period before starting usual communication.

According to the fourth aspect of the present invention, the transmitting side is a remote terminal and the receiving side is a central office.

In this case, the remote terminal comprises: a timing signal generating unit for generating the timing signal synchronized with a periodical noise including the periodical noise duration which interferes the remote terminal and the central office; a receiver equalizer; and a sequencer for effecting a transition of the status of initialization of the remote terminal during an initialization period before starting usual communication.

In both the third and fourth aspects of the present invention, the initialization period includes an activation and acknowledgement sequence, a transceiver training sequence for performing an initial training of the receiver equalizer, a channel analysis sequence for measuring the quality of the communication line, and an exchange sequence for determining the transmitting capacity of the communication line based on the measured quality of the communication line.

In both the third and fourth aspects of the present invention, the sequencer effects the transition of the status based on the value counted by said hyperframe counter.

In both the third and fourth aspects of the present invention, during the transceiver training sequence, the exchange sequence, and the channel analysis sequence, the initialization is carried out by transmitting modulated symbols through only the inside of the sliding window.

In both the third and the fourth aspects of the present invention, during the transceiver training sequence, the exchange sequence, and the channel analysis sequence except for a quality measuring sequence, the initialization is carried out by transmitting modulated symbols through only inside of sliding window, and during the quality measuring sequence in the channel analysis sequence, the initialization is carried out by transmitting modulated symbols through both the inside and the outside of the sliding window.

In both the third and the fourth aspects of the present invention, the system further comprises a sequence transition determining unit for making a transition, in synchronization with the timing signal, from the activation and acknowledgement sequence to the transceiver training sequence or from the transceiver training sequence to the channel analysis sequence.

In both the third and the fourth aspects of the present invention, according to a dual bitmap mode, the modulated symbols are transmitted from the transmitting side through both the inside and the outside of the sliding window, and the modulated symbols are used for training of the receiver equalizer by the receiving side only when the receiving side is in a far end cross-talk duration.

In both the third and the fourth aspects of the present invention, according to the dual bitmap mode, during the training of the receiver equalizer in the transceiver training sequence, a step size for updating coefficients of the equalizer is made to be zero in the near end cross-talk duration, or to be a value smaller than the value in the far end cross-talk duration in the near end cross-talk duration at the receiving side, so that the transceiver training sequence is carried out continuously in the far end cross-talk duration and the near end cross-talk duration at the receiving side.

In both the third and fourth aspects of the present invention, the receiving side comprises: a synchronization symbol detecting unit for detecting a synchronization symbol included in each of superframes which constitute the hyperframe; an inverse synchronization symbol detecting unit for detecting an inverse synchronization symbol included in the hyperframe; and an inverting unit for rotating the phase of each carrier signal of the detected inverse synchronization symbol, except for the carrier signal of a pilot tone, by substantially 180° to obtain an inverted inverse synchronization symbol having the same phase as the phase of each of the detected synchronization symbols. In this case, the detected synchronization symbols and the inverted inverse synchronization symbol are used for the training of receiver equalizer.

According to a fifth aspect of the present invention, there is provided a digital subscriber line communicating system for communicating between a transceiver in a central office and a transceiver in a remote terminal through a communication line, wherein, during timing recover training sequence between the central office and the remote terminal, an inside symbol of a downstream sliding window is formed by a first kind of signal, and an outside symbol of the downstream sliding window is formed by a second kind of signal. In this case, the first kind of signal and the second kind of signal are obtained by modulating a carrier signal but are different in phase by a predetermined angle. The transceiver in the remote terminal recognizes whether a received symbol belongs to a far end cross-talk duration at the remote terminal or a near end cross-talk duration at the remote terminal, by detecting the phase of the output of a fast Fourier transform of the carrier signal, so as to recognize the phase of a timing signal which represents a periodical noise duration.

According to a sixth aspect of the present invention, a quadrature phase shift keying demodulation is employed to recognize the phase of a timing signal.

According to a seventh aspect of the present invention, there is provided a digital subscriber line communicating system for communicating between a central office and a remote terminal; the central office comprising: a phase-locked loop circuit for synchronizing a network timing reference signal, having a frequency higher than the frequency of a first timing signal, with an oscillating signal of a crystal oscillator provided in the central office, to generate a master clock signal; and a timing signal regenerating circuit for shifting the phase of the first timing signal to provide a synchronization in phase with the phase of the master clock signal so as to generate a second timing signal to be used in the central office.

According to an eighth aspect of the present invention, there is provided a transceiver to be connected through a communication line, having the same features as in the above-described system.

BRIEF DESCRIPTION OF THE DRAWINGS

The above objects and features of the present invention will be more apparent from the following description of the preferred embodiments with reference to the accompanying drawings, wherein:

FIG. 1B is a block diagram showing a remote terminal according to an embodiment of the present invention;

FIG. 2 is a timing chart of the TCM-ISDN cross-talk;

FIG. 3 is a diagram showing a sliding window;

FIGS. 4A and 4B are a diagram schematically showing timing charts for initialization;

FIG. 12 is a diagram showing the SWB method in the case where two bitmaps are used;

DESCRIPTION OF THE PREFERRED EMBODIMENTS

An embodiment of the present invention will be described below with reference to the drawings.

Figure 1A:
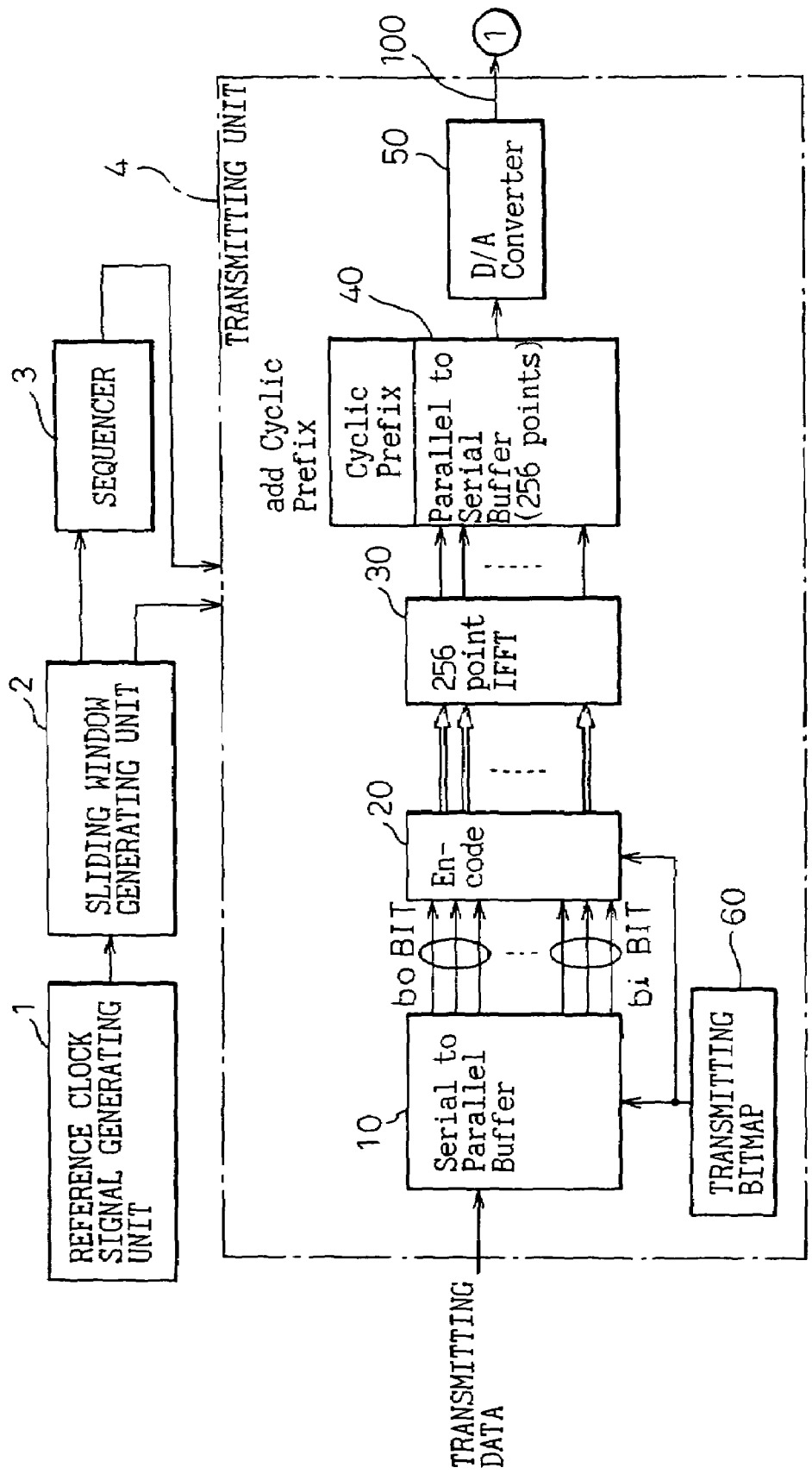
FIG. 1A is a block diagram showing a central office according to an embodiment of the present invention.

FIG. 1A is a block diagram showing functional blocks of a central office according to an embodiment of the present invention; and FIG. 1B is a block diagram showing functional blocks of a remote terminal according to an embodiment of the present invention.

As shown in FIG. 1A, the central office includes a reference clock signal generating unit 1, a sliding window generating unit 2, a sequencer 3, and a sliding window transmitting unit 4. The reference signal generating unit 1 generates a reference clock signal having a frequency of, for example, 400 Hz, synchronized with a TCM ISDN transmission which interferes with the central office and the remote terminal. The reference clock signal may be generated based on an external signal or with an internal signal generated by a crystal oscillator as an example.

The sliding window generating unit 2 generates a downstream sliding window from the generated reference clock signal. The downstream sliding window discriminates whether the transmitting DMT symbols are received in a far end cross-talk duration or in the other duration at the remote terminal. The discriminated result is sent to the sliding window transmitting unit 4.

The sequencer 3 controls a sequence transition in the central office during an initialization period of the communicating system.

The sliding window transmitting unit 4 transmits the DMT symbols according to the downstream sliding window to the remote terminal.

As shown in FIG. 1B, the remote terminal includes a sliding window receiving unit 5, a reference clock signal generating unit 6, a sliding window generating unit 7, and a sequencer 8.

The sliding window receiving unit 5 receives the DMT symbol, according to the downstream sliding window from the central office.

The reference clock signal generating unit 6 generates a reference clock signal from received DMT symbols which are transmitted from the central office according to the sliding window.

The sliding window generating unit 7 generates a downstream sliding window from the generated reference clock signal by the reference clock signal generating unit 6. The generated downstream sliding window defines whether the received DMT symbols are received in a far end cross-talk duration or other duration at the remote terminal.

The sequencer 8 controls a sequence transition in the remote terminal during the initialization period of the communicating system.

The reference clock signal in the central office may be generally referred to as a timing signal which is synchronized with the transmission system which interferes with the central office and the remote terminal.

DMT modulation will be explained using the G.lite as an example and with reference to FIGS. 1A and 1B. This explanation and the associated drawings will describe only the downstream modulation/demodulation from the central office to the remote terminal. However, the DMT modulation is also possible in the upstream direction.

Firstly, transmitting data is input into an ADSL transceiver unit (ATU) in the central office and a one-symbol time (¼ kHz) of the data is stored in a serial to parallel buffer 10. The stored data are divided into a plurality of groups. A predetermined number of transmission bits b0, . . . , or bi per a carrier signal is previously allocated to each group in accordance with a transmitting bitmap 60 which will be described later in detail. Each group is output to an encoder 20. In the encoder 20, each group of the input bit series is converted into a signal point expressed by a complex number for an orthogonal amplitude modulation and is output to IFFT 30. The IFFT 30 performs the conversion from each of the signal points to transmitting signal sequence by an inverse fast Fourier transform. The signals from the IFFT 30 are output to a parallel to serial buffer 40. Here the sixteen tail points 240–255 of the outputs of the IFFT 30 are added as a Cyclic Prefix to the head of each DMT symbol. The output of the parallel to serial buffer 40 is supplied to a D/A converter 50 in which the digital signal with a sampling frequency of 1.104 MHz is converted into an analog signal. The analog signal is transmitted through a metalic line 100 to a remote terminal.

At the remote terminal side, the analog signal is converted into a digital signal with a sampling frequency of 1.104 MHz by an A/D converter 110. Each DMT symbol of the digital signal is stored in a serial to parallel buffer 120. In the buffer 120, the Cyclic Prefix is removed from the digital signal, and the remaining signal is output to an FFT 130. In the FFT 130, a fast Fourier transform is effected to generate or demodulate the signal points. The demodulated signal points are decoded by a decoder 140 in accordance with a receiving bitmap 160 having the same values as those in the transmitting bitmap 60. The decoded data are stored in a parallel to serial buffer 150 as receiving data of bit-sequences b0, . . . , and bi.

In the following, an initialization, a sliding window generating unit and a sequencer, a transceiver training, and an inverse synchronization symbol will be described.

(1) Initialization

FIGS. 4A and 4B schematically show timing charts for the initialization of the ADSL transceivers ATU-C and ATU-R. The initialization period includes an activation and acknowledgement sequence for determining whether a dual bitmap mode or a single bitmap mode should be used in the central office or in the remote terminal, a transceiver training sequence for performing an initial training of the central office or the remote terminal, a channel analysis sequence for measuring the quality of said communication line, and an exchange sequence for determining the transmitting capacity of the communication line based on the measured quality of said communication lines, and for informing the transmitting capacity to each other. The channel analysis sequence includes a C-MEDLEY in the ATU-C and an R-MEDLEY in the ATU-R. The C-MEDLEY and the R-MEDLEY are sequences for measuring S/N. At the time of ADSL training, it is important to send out ADSL signals only during the period when the NEXT noise for the TCM-ISDN is not generated at the TCM-ISDN receiving side, taking the effect on the TCM-ISDN into account for both upstream and downstream transmission. For this reason, as shown in FIGS. 4A and 4B, during the transceiver training and exchange sequence, the initialization is performed according to the single bitmap mode. Also, during the channel analysis sequence, the initialization is performed according to the single bitmap mode for the sequences other than the C-MEDLEY and the R-MEDLEY. During the C-MEDLEY and the R-MEDLEY, on the other hand, the line quality is checked, that is, S/N is measured by both the inside and outside symbols according to a dual bitmap mode, or by the inside symbol only according to a single bitmap mode.

(2) Sliding Window Generating Unit and Sequencer

Figure 5:
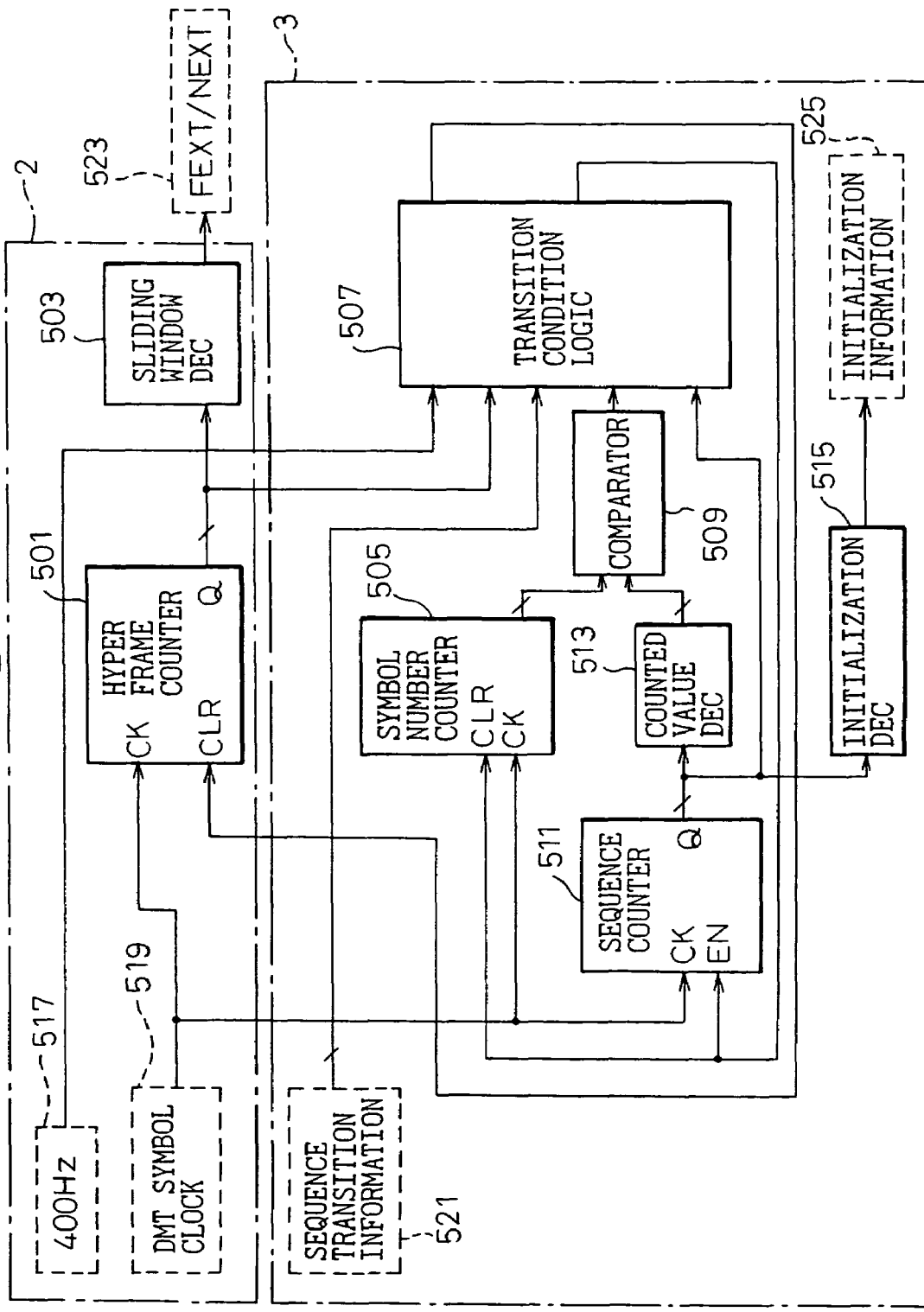
FIG. 5 is a block diagram showing a sliding window generating unit and a sequencer according to an embodiment of the invention.

FIG. 5 shows the construction of the sliding window generating unit 2 or 7 in FIG. 1A or 1B, and the construction of the sequencer 3 or 8 in FIG. 1A or 1B, according to an embodiment of the present invention.

The sliding window generating unit and sequencer shown in FIG. 5 is included in each of the center ADSL unit (ATU-C) and the subscriber ADSL unit.

As shown in FIG. 5, the sliding window generating unit includes a hyperframe counter 501, a sliding window decoder 503, and the sequencer includes a symbol number counter 505, a transition condition logic unit 507, a comparator 509, a sequence counter 511, a count value decoder 513, and an initialization decoder 515. The timing signal (400 Hz) 517 is provided from the reference clock generating unit 1 or 6 in FIG. 1A or 1B. The DMT symbol clock 519 has a period of one DMT symbol time. The sequence transition information 521 is an external condition for sequence transition (for example, activation signal detection flag, etc.). The FEXT/NEXT signal 523 represents inside or outside of the sliding window. The initialization information signal control the transmitting unit and receiving unit according to initialization sequence.

In operation, the hyperframe counter 501 counts the number of DMT symbols by counting the DMT symbol clocks 519 a predetermined number of times (for example, 345 times) continuously. Using this count value, the sliding window decoder 503 discriminates whether a transmitting or receiving DMT symbol belongs to a $FEXT_R$, $NEXT_R$, $FEXT_C$ or $NEXT_C$ duration in the sliding window.

Also, the center ADSL unit ATU-C starts the C-REVEILLE (the first sequence of downstream transceiver training sequence) and C-RATES1 (the first sequence of downstream channel analysis sequence), and the subscriber ADSL unit ATU-R starts the R-REVERB3 (the first sequence of upstream channel analysis sequence), respectively, synchronized in phase with the timing signal 517 having a frequency of 400 Hz. This can be realized by making the 400 Hz timing signal 517 as the condition for sequence transfer in the transition condition logic unit 507 and by clearing the hyperframe counter 501 in response to the timing signal. The symbol number counter 505 counts the number of DMT symbols by counting the DMT symbol clocks 519, and by making the comparison with the number of the DMT symbols output from the count decoder 513 as a condition for sequence transfer in the transition condition logic unit 507, the number of DMT symbols is the length of each sequence in the initialization period. Also, the sequence transition information 521 is input as a sequence transition condition into the transition condition logic unit 507. When the sequence transition occurs, the transition condition logic unit 507 outputs an enable signal to the enable terminal EN of the sequence counter 511. Thus, the sequence counter 511 increments its count each time when the sequence in the initialization period transfers from one sequence to the next sequence. The count value decoder 513 decodes the count value output from the sequence counter 511 to output the number of the DMT symbols corresponding to the count value, i.e., the length of the sequence. The count value output from the sequence counter 511 is also input to the initialization decoder 515. The initialization decoder 515 generates an initialization information 525 to control the transmitting unit and receiving unit, for example, determining the initialization signals such as the C-REVEILLE and the C-PILOT1 (timing recovery training signals in transceiver training sequence), etc. to be transmitted or to be received.

The above-described configuration has been described as realized with hardware, however, it can also be realized in software with a similar configuration.

Also, in the C-PILOT1, the phase of the TCM-ISDN timing signal of 400 Hz is notified from the center ADSL unit (ATU-C) to the subscriber ADSL unit (ATU-R), which in turn detects and converts it into a timing signal having a frequency of 400 Hz by the reference clock signal generating unit 6 in FIG. 1B. In this method, though described in detail later, the subscriber ADSL unit (ATU-R) can periodically detect cross-talk duration of TCM-ISDN.

(3) Transceiver Training Sequence

The transceiver training sequence includes a timing recovery training sequence, an automatic gain control AGC training sequence, equalizer training sequence such as a time domain equalizer TEQ, a frequency domain equalizer FEQ, and a training sequence for frame synchronization. These trainings are performed when a pseudo random signal such as a synchronization symbol S is repeatedly sent out by the ADSL transceiver. In the transceiver training sequence, the initialization is performed according to a single bitmap mode in which synchronization symbols are transmitted and received only in the $FEXT_R$ or $FEXT_C$ duration, so that the transceiver training sequence is performed only in the $FEXT_R$ or $FEXT_C$ duration as a matter of course.

It should be noted that there may be a case in which, in the initialization in the transceiver training sequence, even when training symbols are transmitted according to a dual bitmap mode in which the training symbols are transmitted in both inside and outside of the sliding window, the receiving side may use the training symbols only inside of the sliding window for training the equalizer.

In the equalizer training sequence in the transceiver training sequence, a step size for updating coefficients of the equalizer such as TEQ and FEQ in the $NEXT_R$ or $NEXT_C$ duration is made to be zero or to be a very small value smaller than the value in the $FEXT_R$ or $FEXT_C$ duration, so that the eqalizer training sequence is carried out continuously whether the training symbol is transmitted both inside and outside of the sliding window.

(4) Inverse Synchronization Symbol

Figure 9:
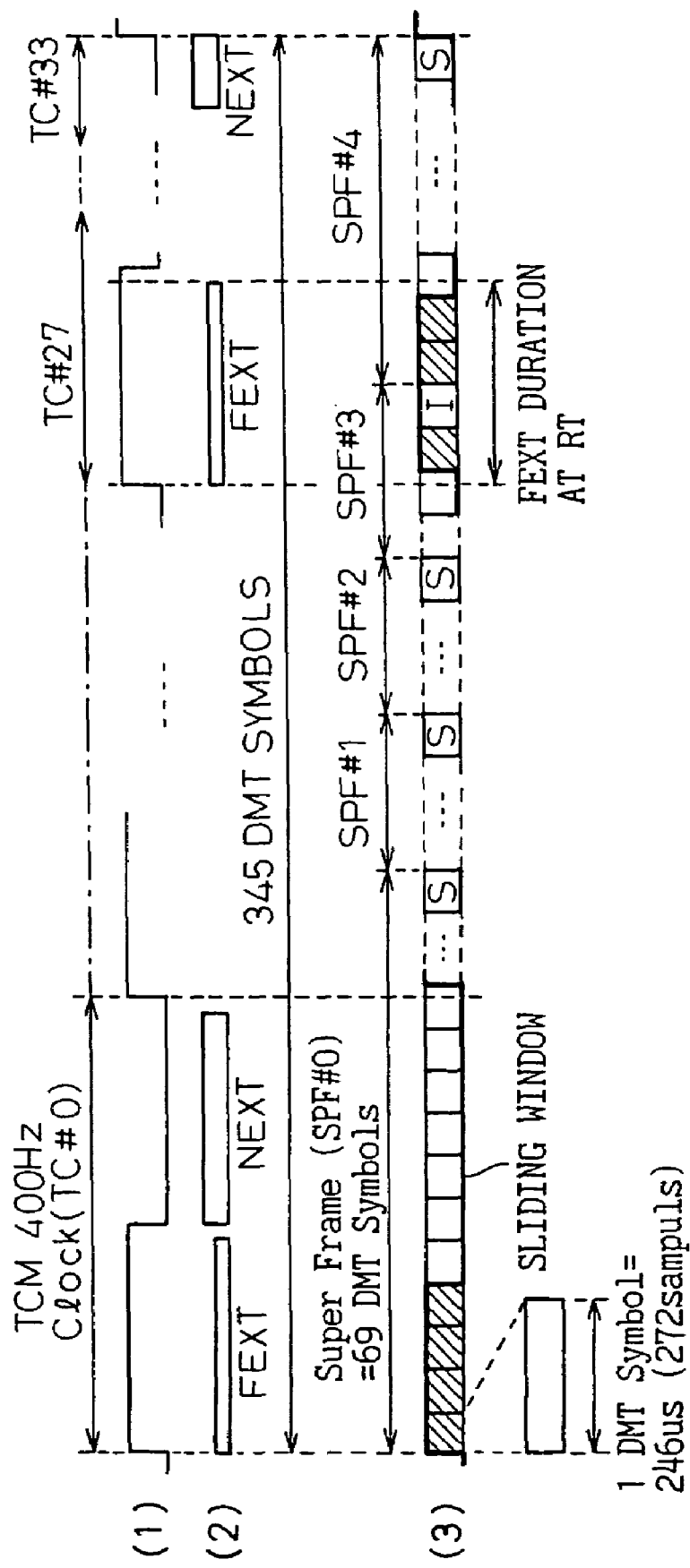
FIG. 9 is a diagram showing a transmission pattern of SWB method at the central office side.
Figure 10:
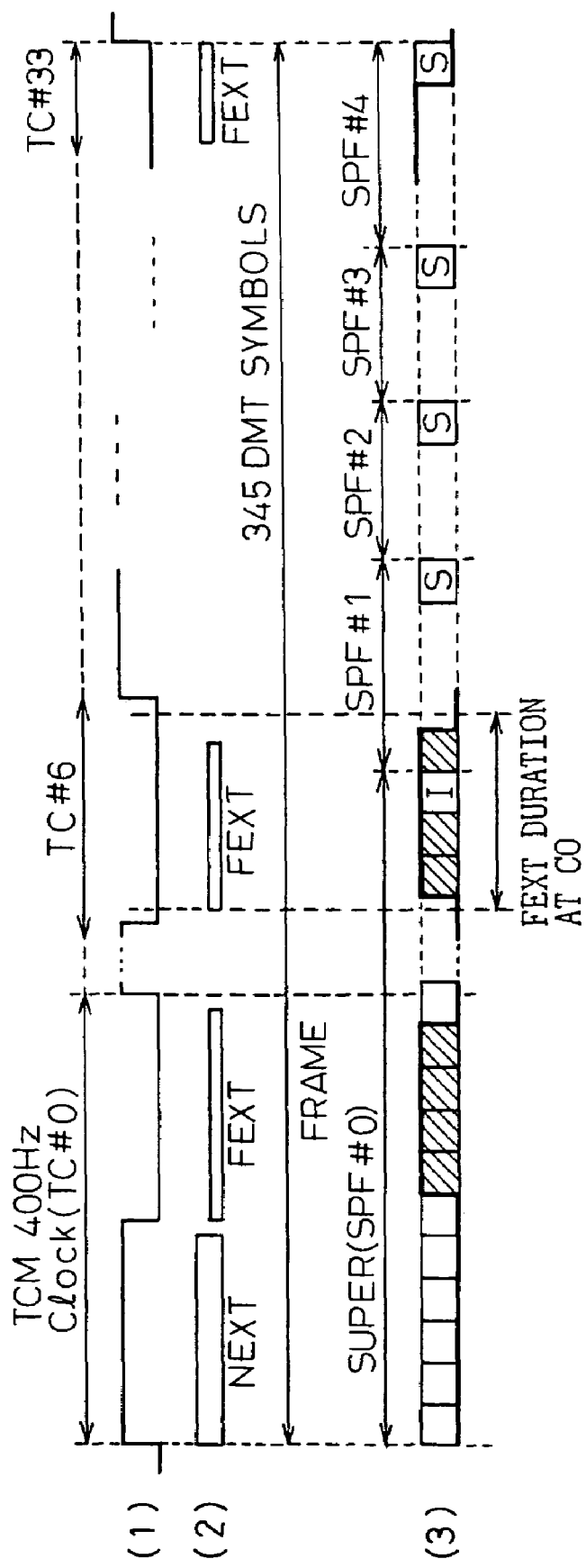
FIG. 10 is a pattern showing a transmission pattern of SWB method at the remote terminal side.

As shown in FIGS. 9 and 10, each hyperframe contains one inverse synchronization symbol I. In each equalizer training, however, the inverse synchronization symbol I is also used in combination with the synchronization symbol S in the following manner in order to improve the convergence rate.

Upon receipt of the inverse synchronization symbol I at the receiving side, the phase of each carrier except for the pilot tone is rotated by an inverter 135 by 180 degrees after the fast Fourier transform by the FET 130 shown in FIG. 1B. As a result, the same state is realized as when the synchronization symbol S is received. Then, the training is carried out using the synchronization symbol S generated at the receiving side.

For watching or re-synchronizing the superframe or the hyperframe synchronization, in the case where the synchronization symbol S is detected, the detection is checked with the next inverse synchronization symbol I, and in the case where the inverse synchronization symbol I is detected, on the other hand, the detection is checked with the next detected synchronization symbol S.

(5) Method of Informing the Phase of TCM-ISDN Timing Signal With 400 Hz From Center ADSL Unit (ATU-C) to Subscriber ADSL Unit (ATU-R)

A method for informing the phase of TCM-ISDN timing signal with 400 Hz from the center ADSL unit (ATU-C) to the subscriber ADSL unit (ATU-R) is described in detail below.

In addition to the pilot tone, the C-PILOT1 transmits an i-th carrier belonging to the frequency band with small cross-talk from TCM-ISDN. The i-th carrier may be, for example, 74th carrier having a frequency of 319.125 kHz. The phase of TCM-ISDN timing signal with 400 Hz is informed from the center ADSL unit (ATU-C) to the subscriber ADSL unit (ATU-R) in the i-th carrier using 4-quadrature amplitude modulation (QAM) in the manner described below. This informing process is shown in FIG. 11 and table 1 below.

TABLE 1

| DURATION | BIT SEQUENCE BEFORE MODULATION | PHASE AFTER MODULATION |
|---|---|---|
| $FEXT_R$ DURATION (BITMAP A) | {0, 0} | (++) |
| $NEXT_R$ DURATION (BITMAP B) | {0, 1} | (+−) |

Figure 11:
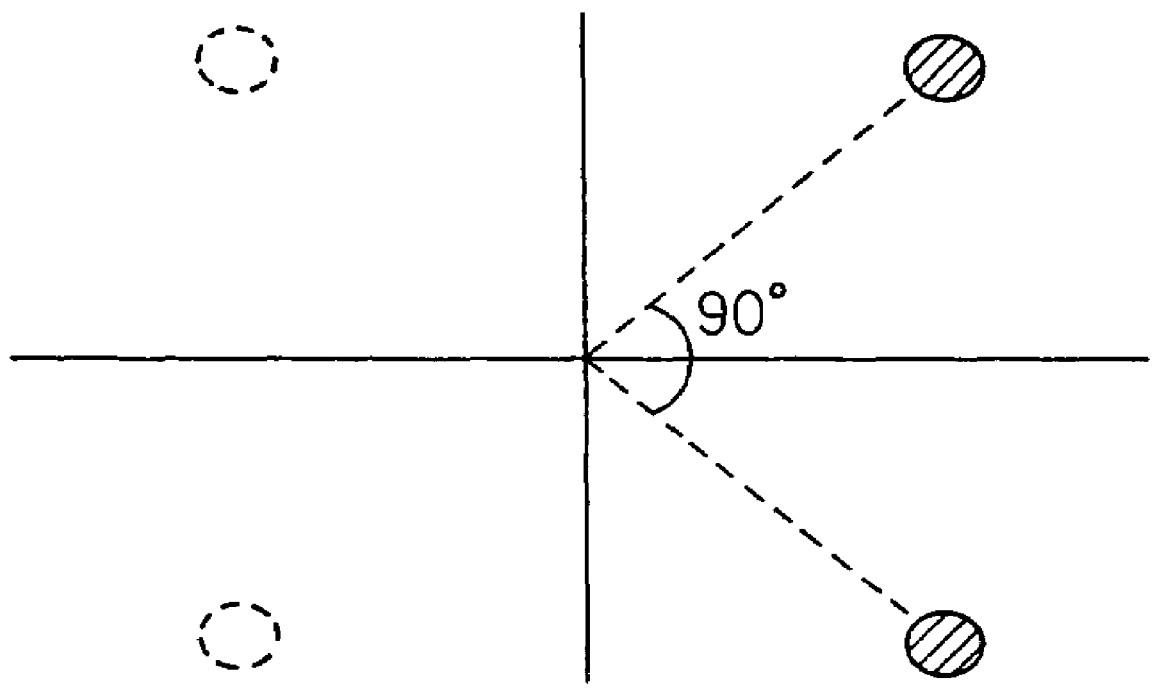
FIG. 11 is a diagram showing a signal modulating point during timing recover sequence.
Figures 13A, 13B:
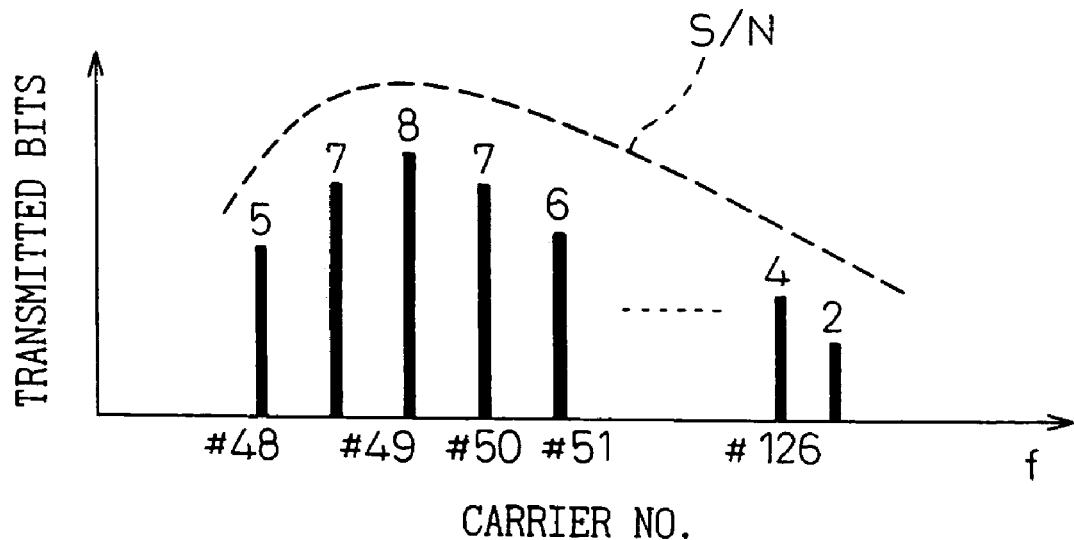
FIGS. 13A and 13B are diagrams showing the definition of a bitmap.
Figure 14:
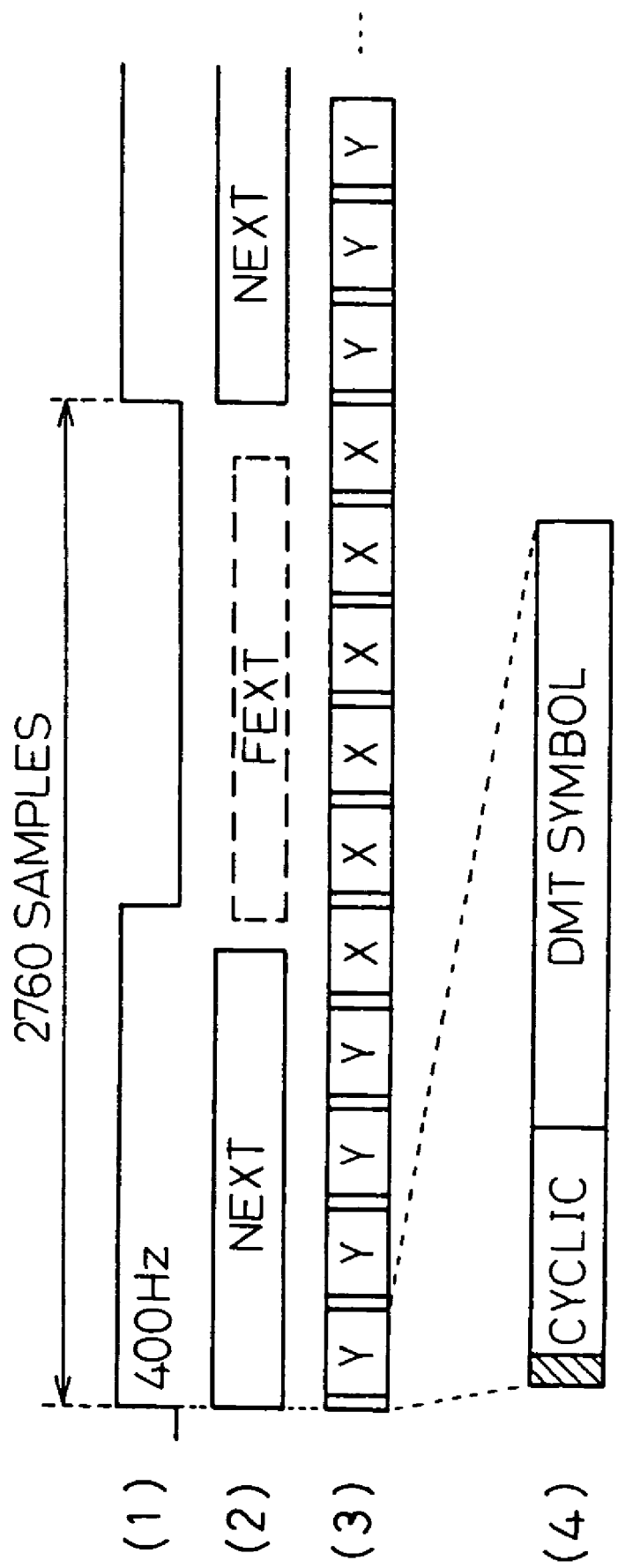
FIG. 14 is a diagram showing a conventional signal structure.

As can be seen from FIG. 11 and the table 1, the two bits {0, 0} in the $FEXT_R$ duration are modulated to (++) which represents the first quadrant; and the two bits {0, 1} in the $NEXT_R$ duration are modulated to (+−) which represents the fourth quadrant.

The subscriber ADSL unit (ATU-R) receives the i-th carrier sent thereto from the center ADSL unit (ATU-C) and recognizes the phase of the TCM-ISDN timing signal with 400 Hz by either of the two methods described below.

(i) Method of Recognizing the Phase of the TCM-ISDN Timing Signal with 400 Hz by Performing a Fast Fourier Transform The subscriber ADSL unit (ATU-R), after receiving the i-th carrier, executes the fast Fourier transform by the FFT 130 shown in FIG. 1B. From the phase of this FFT output, it recognizes whether the carrier belongs to the $FEXT_R$ duration or the $NEXT_R$ duration. The subscriber ADSL unit recognizes the phase of the TCM-ISDN timing signal of 400 Hz using this information.

In this method, however, the subscriber ADSL unit (ATU-R) can recognize the phase of the TCM-ISDN timing signal of 400 Hz only with a relatively low accuracy. The following method is effective for achieving a higher accuracy.

Figure 6:
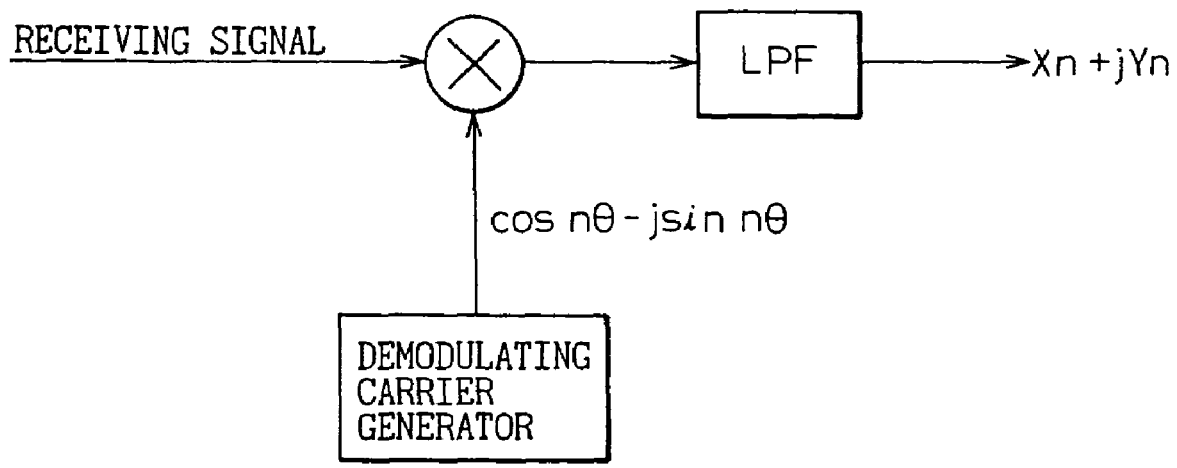
FIG. 6 is a diagram showing the QPSK demodulation.

(ii) Method of Recognizing the Phase of the TCM-ISDN Timing Signal with 400 Hz by Carrying Out QPSK Demodulation The subscriber ADSL unit (ATU-R) executes the QPSK demodulation as shown in FIG. 6 after receiving the i-th carrier. From this result, it recognizes that the receiving signal belongs to the $FEXT_R$ duration or the $NEXT_R$ duration. Using this information, the subscriber ADSL unit (ATU-R) recognizes the phase of the TCM-ISDN timing signal with 400 Hz.

This method makes it possible for the subscriber ADSL unit (ATU-R) to recognize the phase of the TCM-ISDN timing signal with 400 Hz with a high accuracy.

(6) Method of Configuring PLL of TCM-ISDN 400 Hz Burst Clock

Figure 7:
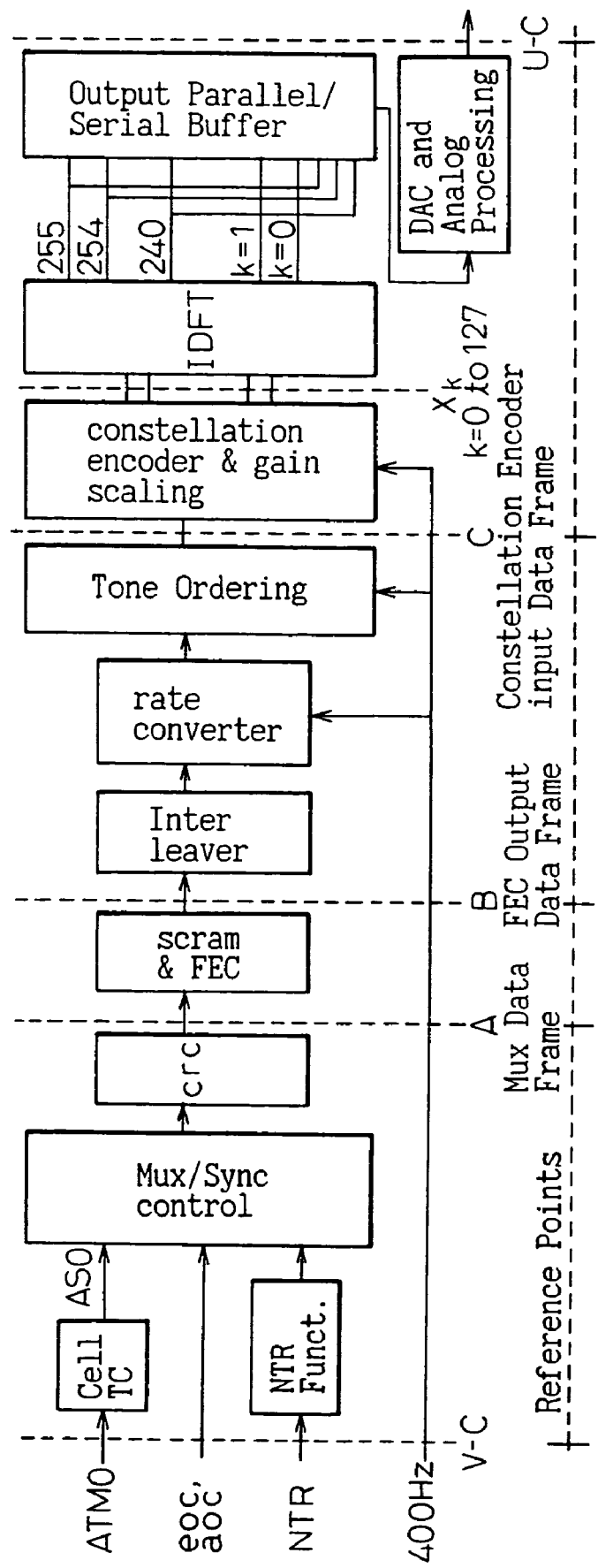
FIG. 7 is a block diagram showing a reference model of the ATU-C transmitter.

FIG. 7 shows a reference model of the ATU-C transmitter. As shown in FIG. 7, the center ADSL unit (ATU-C) is kept supplied with a signal of 8 kHz clock called NTR (network timing reference) from an external source. The signal of the TCM-ISDN timing signal with 400 Hz may also be supplied from an external source. The TCM-ISDN timing signal with 400 Hz may alternatively be generated in the center ADSL unit (ATU-C) without being supplied from an external source (see Japanese Patent Application No. 10-115223, for example). In this process, the TCM-ISDN timing signal with 400 Hz and the 8 kHz NTR are synchronized in frequency with each other.

Figure 8:
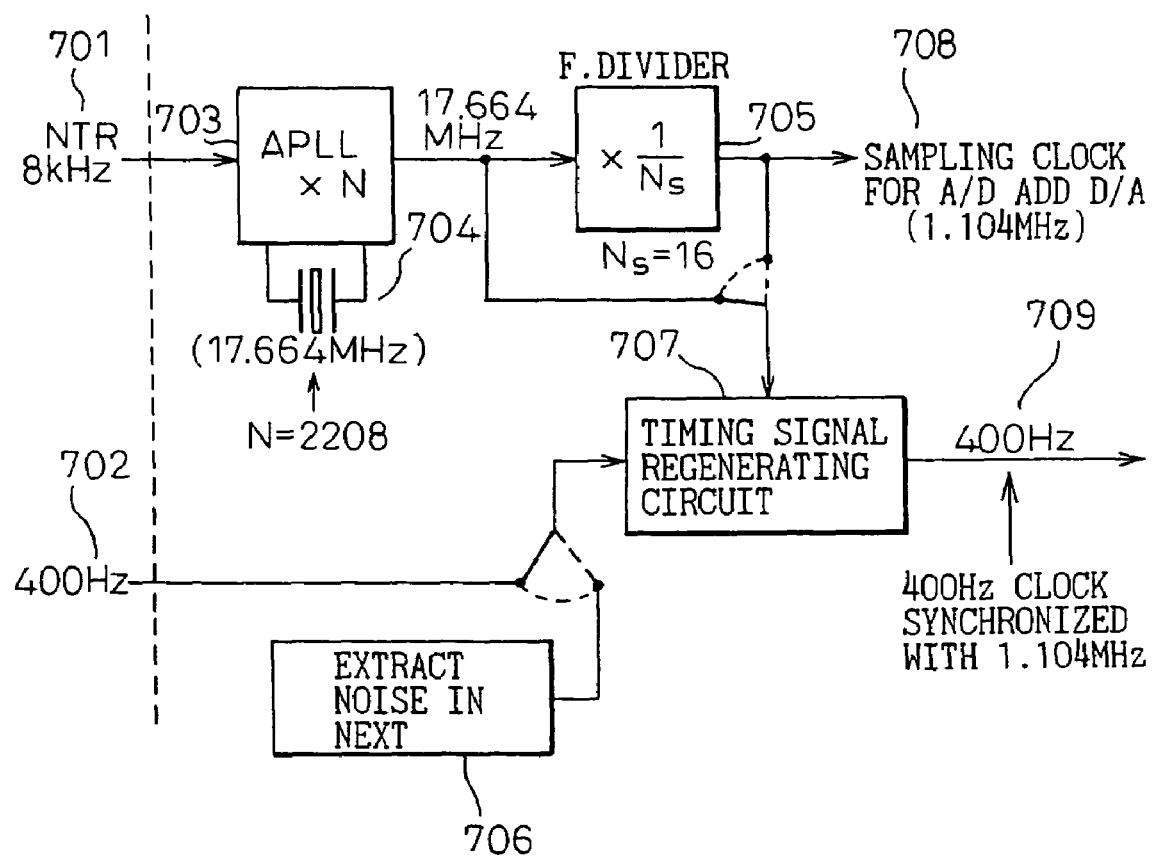
FIG. 8 is a diagram showing a reference clock signal generating unit in the ATU-C.

FIG. 8 shows a reference clock signal generating unit in the ATU-C, according to a further embodiment of the present invention.

In FIG. 8, the NTR signal having a frequency of 8 kHz is applied to an analog PLL circuit 703. An oscillating signal of 17.664 MHz is generated from a crystal oscillator 704. By the analog PLL circuit 703, the oscillating signal from the crystal oscillator 704 is synchronized in phase with the NTR signal, so that the analog PLL circuit 703 outputs a master clock signal of 17.664 MHz. The frequency of the master clock signal is divided by a frequency divider 705 so that a sampling clock signal 708 with 1.104 MHz for A/D converters or D/A converters is obtained. The master clock signal is also applied to a timing signal regenerating circuit 707 in which the phase of the TCM-ISDN timing signal 702 is shifted to make a synchronization in phase with the phase of the master clock signal. Thus, the internal timing signal 709 having the frequency of 400 Hz is obtained.

In the preceding art, the TCM-ISDN timing signal 702 of 400 Hz is input to the analog PLL circuit 703 in the center ADSL unit (ATU-C), and is synchronized with the oscillating signal from the VCXO 704 therein. The oscillation frequency of the VCXO of the center ADSL unit (ATU-C) is 17.664 MHz for example. In such a case, in order to synchronize the signal from the VCXO 704 with the TCM-ISDN timing signal of 400 Hz, the phase comparison information is acquired once for each 44160 times (17.664 M/400) for PLL sync operation. Normally, the more the number of phase comparisons, the smaller the phase jitter or the frequency error. The phase comparison conducted once for each 44160 times with the clock of 17.664 MHz, however, normally increases the phase jitter and the frequency error greatly.

In order to avoid this, according to this embodiment, the NTR signal 701 with 8 kHz synchronized with the TCM-ISDN timing signal of 400 Hz which is always supplied to the center ADSL unit (ATU-C) from an external source is used to perform the PLL synchronization operation of VCXO in the center ADSL unit (ATU-C). Thus, the number of times of the phase comparison increases 20 times as large as for the TCM-ISDN timing signal with 400 Hz. Thus, the phase comparison information is obtained at the rate of once for each 2208 times, thereby making it possible to reduce the phase jitter and the frequency error.

The embodiments of the invention described above represent only an example, and other many modifications are conceivable. In any way, however, the present invention has, of course, the same effect.

It will thus be understood from the foregoing detailed description that according to this invention, there are provided a specific training method for the ADSL transceiver in employing an effective transmission technique for the ADSL signal in the noise environment from the TCM-ISDN or a digital subscriber line transmission system and a communication apparatus comprising means for carrying out the particular training method.

What is claimed is:

1. A digital subscriber line transmitting method in a transceiver comprising the steps of:
   performing transceiver training in noisy TCM-ISDN environment, wherein the performing step comprises:
   performing the transceiver training of an xDSL transceiver in a far end cross-talk duration by means of a sliding window, said far end cross-talk duration being in a first half period of one cycle of said TCM-ISDN, while an initialization is performed by a single bitmap mode, said single bit map mode being a mode for transmitting signals during only the far end cross-talk duration in which the number of signals to be transmitted is larger than the number of signals to be transmitted in a near end cross-talk duration.

2. An asymmetric digital subscriber line unit comprising an xDSL transceiver for utilizing a telephone line as a data communication line in a noisy TCM-ISDN environment, said xDSL transceiver comprises:
   a unit for transmitting a signal of said asymmetric digital subscriber line unit in a far end cross-talk duration by means of a sliding window based on a TCM-ISDN timing signal, said far end cross-talk duration being in a first half period of one cycle of said TCM-ISDN, while said asymmetric digital subscriber line unit is training by a single bitmap mode, said single bit map mode being a mode for transmitting signals during only the far end cross-talk duration in which the number of signals to be larger than the number of signals to be transmitted in a near end cross-talk duration.

* * * * *

UNITED STATES PATENT AND TRADEMARK OFFICE
CERTIFICATE OF CORRECTION

| | | |
|---|---|---|
| PATENT NO. | : 7,167,509 B2 | Page 1 of 1 |
| APPLICATION NO. | : 11/070751 | |
| DATED | : January 23, 2007 | |
| INVENTOR(S) | : Kazutomo Hasegawa et al. | |

It is certified that error appears in the above-identified patent and that said Letters Patent is hereby corrected as shown below:

On the Title Page (57) in the Abstract, line 3, please change "tough" to --through--.
In Claim 1, column 14, line 14, please insert --a-- before "noisy".
In Claim 2, column 14, line 42, please insert --transmitted is-- before "larger".

Signed and Sealed this

Twenty-ninth Day of July, 2008

JON W. DUDAS
*Director of the United States Patent and Trademark Office*